United States Patent [19]

Ronning

[11] 4,227,448

[45] Oct. 14, 1980

[54] PELLET PRE-COOLER FOR PELLET MILL

[75] Inventor: Richard L. Ronning, Overland Park, Kans.

[73] Assignee: Ronning Engineering Company, Inc., Overland Park, Kans.

[21] Appl. No.: 915,070

[22] Filed: Jun. 7, 1978

[51] Int. Cl.[3] ........................ A23K 1/14; A23K 1/20; A23N 17/00; A23B 4/06

[52] U.S. Cl. ........................................ 99/489; 99/472; 99/476; 99/517; 99/570

[58] Field of Search .................................. 99/470–472, 99/477, 517, 489; 62/380; 34/62, 67; 198/850, 851, 952; 425/202, 217, DIG. 230

[56] References Cited

U.S. PATENT DOCUMENTS

| | | | |
|---|---|---|---|
| 2,666,404 | 1/1954 | Kessler | 198/851 |
| 3,181,482 | 5/1965 | Heth et al. | 99/517 |
| 3,288,051 | 11/1966 | Dodgen et al. | 99/517 |
| 3,289,568 | 12/1966 | Ronning | 99/489 |
| 3,429,349 | 2/1969 | Ronning . | |
| 3,695,165 | 10/1972 | Sienkiewicz et al. | 99/471 |

OTHER PUBLICATIONS

Ronning–"Pellet Cooler Air-Lift System" – Ronning Engineering, Inc.

*Primary Examiner*—Philip R. Coe
*Assistant Examiner*—Timothy F. Simone
*Attorney, Agent, or Firm*—Schmidt, Johnson, Hovey & Williams

[57] ABSTRACT

The pellet mill in a processing system for dehydrated forage crops is disposed in proximal pellet-dispensing relation to a pellet pre-cooler for gentle initial cooling and preliminary firming of hot pellets from the mill prior to their conveyance to the primary cooler, whereby to reduce undesired deterioration of the hot pellets into fines during subsequent bulk conveying and cooling operations. The pre-cooler includes an enclosed conveyor presenting a moving pellet-supporting surface for gently transporting hot pellets from the pellet mill along a predetermined path of travel within a vented housing. A blower in communication with the primary cooler creates a negative pressure airflow sufficient to convey pellets from the pre-cooler to the primary cooler; the blower simultaneously draws ambient air into the housing for initially cooling the hot pellets on the conveyor prior to their transfer to the primary cooler. In preferred forms, the pellet-supporting surface is defined by plate sections having multiple perforations for increased circulation of cooling ambient air within the housing.

1 Claim, 5 Drawing Figures

PELLET PRE-COOLER FOR PELLET MILL

TECHNICAL FIELD

This invention concerns mill systems of the type operable to comminute and pelletize dehydrated forage crops and similar materials. More particularly, the invention deals with improvements in the cooling of pellets manufactured in such systems whereby breakage and erosion of pellets after forming is significantly reduced.

BACKGROUND ART

Mill systems for processing dehydrated forage crops are, of course, well known in the art. Such systems are employed to convert dried leafy material into pellet form for ease of handling and storage. These systems typically include a hammer mill for comminuting the dried crop material, a pellet mill for forming pellets from the pulverized material, and a pellet cooler for firming hot fragile pellets produced by the pellet mill to minimize pellet breakage and the formation of fines.

A problem with crop material processing systems heretofore available has been the undesired deterioration of the hot pellets into fines during conveyance from the pellet mill to the cooler and during the cooling cycle itself. In this regard, the size of these mill systems is typically of such magnitude that the pellet cooler is necessarily spaced remote from the pellet mill thereby requiring that the hot pellets from the mill be conveyed (generally by pneumatic means) an appreciable distance prior to cooling. Inasmuch as the hot pellets are relatively fragile, significant erosion and deterioration of the pellets occurs during conveyance between the pellet mill and the cooler resulting in the production of appreciable amounts of fines (small dust like particles of crop material). These fines are undesirable for animal consumption and moreover, they present burdensome material handling and storage problems; hence, the typical practice is to provide means for drawing off fines and recycling them through the pellet mill. This process, of course, reduces the overall efficiency of the pellet cooler and thereby increases the operating cost of the mill system.

Even in systems where the pellet cooler is located in proximity to the pellet mill, undesirable amounts of fines may be produced by virtue of the nature of the operation of the pellet cooler. In this connection, coolers suitable for use in such systems must be capable of rapidly cooling relatively large amounts of material in pellet form. Typically such coolers comprise a ventilated tank into which pellet material is gravity fed and stored while ambient air is circulated through the material for cooling. See for example U.S. Pat. No. 3,289,568 issued Dec. 6, 1966. Though such coolers are highly desirable from the standpoint of economical operation, there may be produced significant amounts of fines in these coolers due to tumbling and interaction of the pellets as they are fed into the cooler and subjected to the cooling air currents.

DISCLOSURE OF INVENTION

The present invention overcomes the problems alluded to above by the provision of a pellet pre-cooler for providing gentle initial cooling to hot pellets immediately after their discharge from the pellet mill and prior to conveyance to the primary cooler. It has been found that by pre-cooling the hot fragile pellets in this manner, formation of fines in the system downstream of the pellet mill is greatly reduced and thus, the volume of material recycled through the pellet mill also decreased.

The pellet pre-cooler comprises a housing having an inlet in pellet-receiving communication with the pellet mill and an outlet coupled with the primary cooler. A conveyor disposed within the housing presents a moving, upwardly facing, pellet supporting surface whereby the hot pellets are gently conveyed along a path of travel between the inlet and outlet of the housing without appreciable relative movement between the pellets.

A blower in communication with the primary cooler creates a sufficient airflow for transporting the pellets from the outlet of the housing to the primary cooler through an interconnecting conduit. Vents are provided in the housing along the length of the conveyer such that the blower means also serves to draw cooling ambient air into the housing for circulation across the hot pellets during their movement along the path of travel defined by the conveyor. Thus, the hot pellets from the pellet mill are provided with initial cooling which renders them sufficiently firm to withstand subsequent conveyance and interaction in the primary cooler without deterioration into undesirable fines.

BEST MODE FOR CARRYING OUT THE INVENTION

Figure 5:
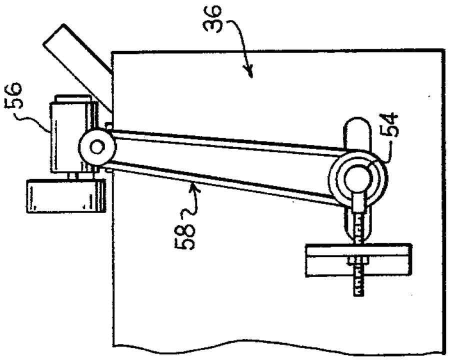
FIG. 5 is an enlarged, fragmentary detail view showing the drive for the conveyor of the pre-cooler.
Figure 1:
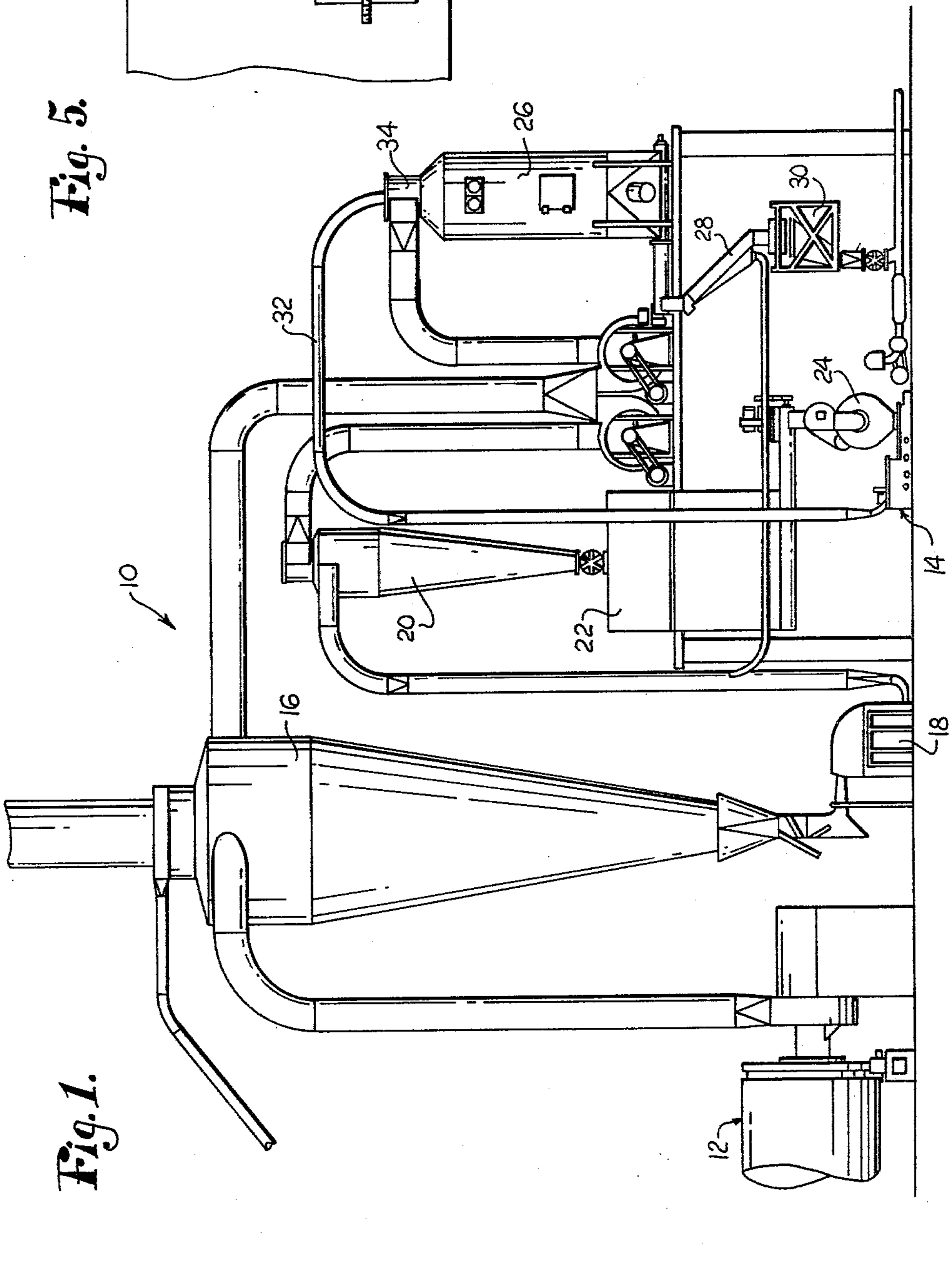
FIG. 1 is a front elevational view of a mill system having a pellet pre-cooler constructed in accordance with the principles of the present invention.

In FIG. 1 there is shown a forage crop processing system 10 disposed in closed communication with the outlet end of a crop material dehydrator dryer 12. The system 10 has a novel pellet pre-cooler 14 and in addition is provided with the usual complement of major components including a primary collector 16 in material receiving communication with the dryer 12, a material-comminuting hammer mill 18, a meal collector and storage bin 20, 22 in communication with the hammer mill 18, a pellet mill 24 disposed immediately adjacent the pellet pre-cooler 14, a primary cooler 26 spaced from the pellet mill 24. Other components of system 10 include a mechanical sifter 28 and a scale 30 beneath the primary cooler 26. The components of the system 10 are appropriately interconnected with requisite conduits for orderly flow of material through the processing system 10 in a manner well known in the art. The system 10 is of the negative pressure type having fans positioned to draw the processed material through the system 10 by negative pressure as opposed to blowing the material by positive pressure.

As shown in FIG. 1, the pellet pre-cooler 14 is in communication with the primary cooler 26 via a conduit 32, negative pressure airflow being established through the conduit 32 by a fan 34 disposed above the primary cooler 26 in open communication therewith.

Dried material from the dehydrator dryer 12 is stored in the primary collector 16 for feeding into the hammer mill 18. Comminuted material from the hammer mill 18 is collected in the meal collector 20 and then directed into the bin 22 for subsequent transfer to the pellet mill 24. The comminuted material is formed into dense pellets in the pellet mill 24, which pellets are then discharged into the pellet pre-cooler 14 and conveyed through the conduit 32 to the primary cooler for cooling and firming prior to being dispensed into the mechanical sifter 28. Charges of pellets from the sifter 28 are weighed on scale 30 and subsequently conveyed to other locations for storage, packaging, or bulk shipment.

With the exception of the provision of the pellet pre-cooler 14, the crop processing system is similar to the apparatus shown in U.S. Pat. No. 3,289,568 issued Dec. 6, 1966 and entitled Product Pelleting And Cooling Apparatus, and this patent is incorporated by reference herein to the extent required for the understanding of the operation of the above described components.

FIGS. 2–5 illustrate in detail the pellet pre-cooler 14 shown disposed between the pellet mill 24 and the primary cooler 26 in FIG. 1. Considering specifically FIG. 2, the pre-cooler 14 includes a box-like, substantially closed, hollow body or housing 36 having an inlet 38 in direct pellet receiving communication with the pellet mill 24 and an outlet 40 spaced laterally from the inlet 38. As shown in the drawing, the housing 36 presents a stair-step configuration when viewed in side elevation such that the height of the housing 36 is greater at the outlet 40 than at the inlet 38.

The housing 36 contains an endless belt-type conveyor 42 extending generally horizontally between the inlet 38 and the outlet 40. The conveyor 42 comprises a series of plate sections 44 mounted on an endless link chain 46 which in turn is trained around a pair of spaced sprockets 48 and 50 respectively. A pair of shafts 52 and 54 are journaled to the sidewalls of the body 36 and support sprockets 48, 50 respectively for rotation about transversely extending axes. An electric motor 56 is coupled to the shaft 54 by a belt and pulley drive 58 for powered rotation of the sprocket 50 in a manner to drive the chain 46 around the sprockets 48, 50.

Figures 2, 3, 4:
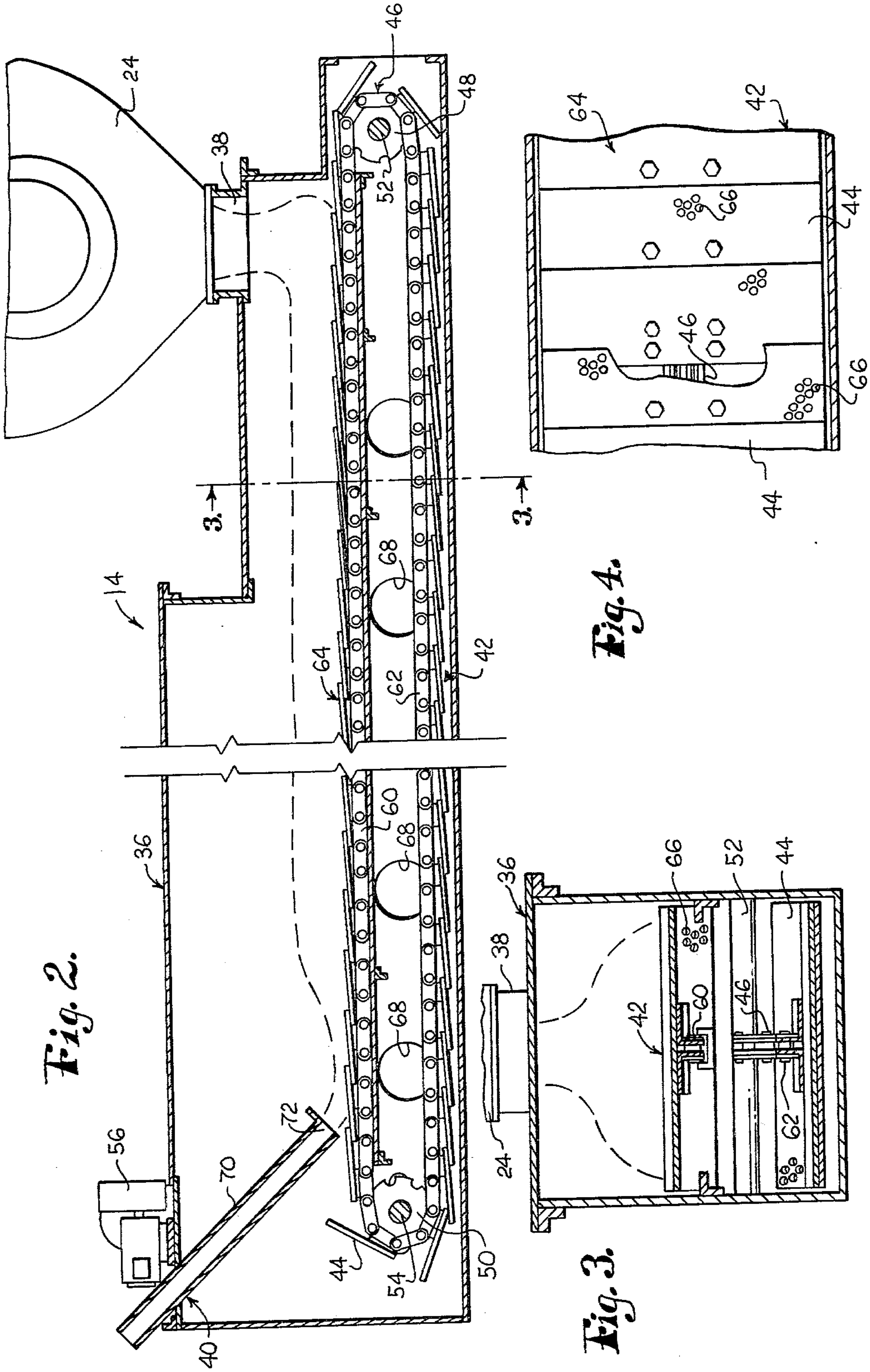
FIG. 2 is an enlarged, fragmentary, cross-sectional view taken along a vertical plane longitudinally of the pellet pre-cooler.
FIG. 3 is an enlarged, cross-sectional view taken along line 3—3 of FIG. 2.
FIG. 4 is an enlarged, fragmentary, cross-sectional view showing a section of the pellet supporting surface presented by the conveyor of the pre-cooler illustrated in FIGS. 2 and 3.

In viewing FIG. 2, it may be seen that the chain 46 presents upper and lower horizontally extending rectilinear stretches 60 and 62 respectively between the sprockets 48, 50. It will also be seen in viewing this figure in combination with FIG. 4, that the plate sections 44 are mounted on the chain 46 in such manner as to overlap along the upper and lower stretches 60, 62 and that the sections 44 face upwardly in stretch 60 while facing downwardly through the stretch 62. Hence, the plate sections 44 along stretch 60 collectively present an upwardly facing, moving, pellet supporting surface 64 for gently conveying hot pellets from the pellet mill 24 along a rectilinear path of travel from the inlet 38 toward the outlet 40. It will be appreciated that the operation of the moving surface 64 is such that the hot pellets do not undergo appreciable relative movement during their travel from inlet 38 to the outlet 40. By virtue of this arrangement, the hot fragile pellets from the mill 24 are protected against deterioration into fines during their travel on the conveyor 42. As shown in FIGS. 3 and 4, the width of the plate sections 44 is sufficient to substantially span the distance between the sidewalls of the body 36 whereby to prevent undesired loss of pelletized material during conveyance from the inlet 38 to the outlet 40.

FIG. 4 also shows that the plate sections 44 are each provided with a pattern of perforations 66 for the purpose of permitting airflow therethrough in a manner to be described. Further in this connection, the sidewalls of the body 36 are provided with a number of vents 68 communicating with the atmosphere whereby ambient air may be introduced into the hollow body 36 as desired. In preferred forms, the vents 68 are disposed at an elevation between the upper and lower stretches 60, 62 as shown in FIG. 2 and are located intermediate the sprockets 48, 50.

The outlet 40 has a tubular extension 70 projecting into the hollow body 36 is and coupled with the conduit 32 which communicates with the primary cooler 26. The extension 70 has a mouth 72 disposed adjacent the pellet supporting surface 64 at a point remote from the inlet 38. Preferably the width of the mouth 72 is substantially the same as the width of the plate sections 44 whereby substantially all of the pellets carried on the surface 64 are intercepted by the tubular extension 70. Thus, it will be appreciated that pellets on conveyor 42 are sucked into the tubular extension 70 and through the outlet 40 under the influence of the negative pressure airflow in conduit 32 established by the fan 34.

Inasmuch as the hollow body 36 is closed except for inlet 38, outlet 40, and the vents 68, the air required to establish a flow through conduit 32 is introduced through the vents 68 in the sidewalls of body 36. Moreover, since the surface 64 defined by the sections 44 substantially blocks communication between the vents 68 and the tubular extensions 70, a large portion of the airflow is necessarily directed upwardly through the perforations 66 of the plate sections 44 in the upper stretch 60. Hence, it will be appreciated that this circulation of relatively cool ambient air through the sections 44 serves to cool the hot pellets carried on the conveyor 42. Consequently, the airflow created by blower 34 serves not only to convey pellets from the pre-cooler 14 to the cooler 26, but also performs a cooling function in the pre-cooler 14 itself. By virtue of this arrangement, the operation of the pre-cooler 14 adds only a minimal burden to the power requirements of the processing system 10.

INDUSTRIAL APPLICABILITY

The general field of use and applicability of the present invention has been explained hereinabove. Specifically, the pellet pre-cooler 14 may be utilized in virtually any processing system wherein hot fragile pellets are produced at some step in the process.

Considering the system 10 shown in FIG. 1 for example, comminuted crop material stored in meal bin 22 is formed into dense pellets of approximately one quarter inch diameter by the pellet mill 24. Pellets from the mill 24 are relatively hot and extremely fragile such that it is necessary to provide cooling apparatus for firming the pellets prior to subsequent processing.

The pellet pre-cooler 14 provides a gentle initial cooling cycle for the fragile pellets whereby the latter are rendered sufficiently firm to withstand subsequent conveyance and bulk cooling without deteriorating into particulates known as fines. In this regard, the pellet supporting surface 64 of conveyor 42 gently conveys the hot pellets along a rectilinear path of travel during which time cool ambient air is circulated through the pellets under the influence of fan 34.

As explained hereinabove, by utilizing the airflow created by the fan 34 to also provide a circulation of cool ambient air within the hollow body 36, the pellet pre-cooler 14 presents no additional power burden on the system 10 with the exception of that required to operate electric motor 56 used to drive conveyor 42. On the other hand, the benefits provided by the pellet pre-cooler 14, in terms of increased operating efficiency of the system 10, are substantial. In this regard, it has been found that by pre-cooling pellets from the pellet mill 24 according to the present invention, formation of fines in conduit 32 and the primary cooler 26 is drastically reduced. Inasmuch as fines must be either discarded or recycled through the system for repelletizing, it will be appreciated that a reduction in the creation of fines directly contributes to improved overall efficiency of the system 10.

Thus, the present invention offers significant advantages over devices heretofore available or known. The advantages discussed are particularly significant in view of the constantly increasing energy costs facing most operators of crop processing systems.

I claim:

1. A mill system for processing crops, comprising:

a pelletizing machine for receiving comminuted crops and producing pellets therefrom; and pellet cooling and conveying means operably coupled to said machine for receiving said pellets therefrom, said cooling and conveying means including a precooler having a hot pellet inlet operably coupled to said pelletizing machine, a pellet outlet spaced from said inlet, generally horizontal conveyor means for gently transporting pellets from said inlet to said outlet without significant breakage and erosion of the pellets, a housing substantially enclosing said conveyor means for defining a precooling chamber, structure de-structure defining at least one air inlet proximal to said conveyor means and communicating the interior of said chamber with a source of air, and means for dispersing air from said source in proximity to said pellets on said conveyor means, said pickup structure having means defining an elongated, pellet inlet opening above and closely adjacent to said conveyor means and extending transversely across substantially the full width of said conveyor means with the height of said inlet opening being less than the width thereof and substantially less than the height of said housing, and an elongated tubular extension coupled to said inlet-defining means and extending upwardly therefrom at an acute angle relative to said conveyor means and generally in the direction of travel of said pellets on said conveyor means for permitting the pellets to enter said pellet pickup opening without an abrupt change of direction of the pellets and consequent significant breakup thereof into fines, said extension being of a cross-sectional configuration which is substantially similar to the configuration of said pellet inlet opening, said inlet opening being the only substantial outlet for air from said housing;

a primary cooler for additional cooling of pre-cooled pellets from said precooler;

conduit means operably coupling and communicating said primary cooler and the end of said extension remote from said pellet inlet opening;

air-moving structure operably associated with said pellet cooling and conveying means, including fan means in communication with said conduit for drawing air through said air inlet and creating a negative pressure airflow through said housing, pellet inlet opening, extension and conduit, for moving air currents from said source thereof through said air inlet, into and through said chamber for dispersal of the air by said air-dispersal means, out of said chamber through said pellet inlet opening and extension, and through said conduit means to said primary cooler, such that:

(a) the air currents cooperatively created and dispersed by said structure and air dispersal means gently precool said initially hot pellets on said conveyor means without significant deterioration thereof into fines; and (b) said air currents at the region of said pellet inlet opening have increased velocity by virtue of the airflow restriction presented by the pellet inlet opening for pneumatically conveying said pellets out of said chamber through said pellet inlet opening and upwardly through said extension to said primary cooler through said conduit means for rapid final cooling of the pellets in said primary cooler.

* * * * *